US008661235B2

(12) United States Patent
Spottswood et al.

(10) Patent No.: US 8,661,235 B2
(45) Date of Patent: Feb. 25, 2014

(54) FIRMWARE STORAGE MEDIUM WITH CUSTOMIZED IMAGE

(75) Inventors: Jason Spottswood, Houston, TX (US); Andrew C. Cartes, Cypress, TX (US); Kevin G. Depew, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 176 days.

(21) Appl. No.: 13/123,194

(22) PCT Filed: Oct. 8, 2008

(86) PCT No.: PCT/US2008/079184
§ 371 (c)(1),
(2), (4) Date: Apr. 7, 2011

(87) PCT Pub. No.: WO2010/042115
PCT Pub. Date: Apr. 15, 2010

(65) Prior Publication Data
US 2011/0197055 A1    Aug. 11, 2011

(51) Int. Cl.
*G06F 9/00* (2006.01)
*G06F 15/177* (2006.01)
*G06F 9/24* (2006.01)

(52) U.S. Cl.
USPC .................................. 713/2; 713/1; 709/220

(58) Field of Classification Search
USPC .......................................... 713/2, 1; 709/220
See application file for complete search history.

(56) References Cited

U.S. PATENT DOCUMENTS

2003/0046529 A1*  3/2003  Loison et al. ................. 713/2
2003/0051128 A1*  3/2003  Rodriguez et al. ......... 713/100
2003/0221092 A1  11/2003  Ballard et al.

(Continued)

FOREIGN PATENT DOCUMENTS

| CN | 101105755 A | 1/2008 |
| EP | 1873638 | 1/2008 |
| JP | 2001-175477 | 6/2001 |

(Continued)

OTHER PUBLICATIONS

"HP Smart Array Controller Driver for Solaris 10 User Guide," Jan. 2007 (Third Edition), Copyright 2007 Hewlett-Packard Development Company, L.P., 22 p.

(Continued)

*Primary Examiner* — Chun Cao
*Assistant Examiner* — Robert Cassity (57) ABSTRACT

In at least some embodiments, a computer system includes a processor and a firmware storage medium in communication with the processor. The firmware storage medium stores a default image invoked during a boot process and selectively stores a customized image. If the customized image is stored by the firmware storage medium, the boot process selectively substitutes at least part of the default image with at least part of the customized image.

16 Claims, 7 Drawing Sheets

(56) References Cited

U.S. PATENT DOCUMENTS

| | | | |
|---|---|---|---|
| 2004/0111597 A1 | 6/2004 | Rothman et al. | |
| 2005/0185055 A1* | 8/2005 | Miller et al. | 348/207.1 |
| 2005/0234846 A1* | 10/2005 | Davidson et al. | 707/1 |
| 2006/0059327 A1* | 3/2006 | Brown et al. | 713/1 |
| 2006/0149955 A1* | 7/2006 | Velhal et al. | 713/1 |
| 2007/0057958 A1* | 3/2007 | Bucher et al. | 345/568 |
| 2007/0103557 A1* | 5/2007 | Prabhu et al. | 348/211.2 |
| 2008/0010447 A1* | 1/2008 | Liao | 713/2 |
| 2008/0046711 A1 | 2/2008 | Tung et al. | |
| 2008/0109647 A1 | 5/2008 | Gavens et al. | |
| 2010/0306773 A1* | 12/2010 | Lee et al. | 718/1 |

FOREIGN PATENT DOCUMENTS

| | | |
|---|---|---|
| JP | 2002-157141 | 5/2002 |
| JP | 2004-220345 | 8/2004 |
| JP | 2007-326249 | 12/2007 |

OTHER PUBLICATIONS

Operating System and ProLiant Server Support, QuickSpecs, SmartStart 8.0, DA-12250, North America, Version 13, Mar. 31, 2008, Copyright 2008 Hewlett-Packard Development Comp.
International Search Report and Written Opinion, dateed May 18, 2009, 11 pages.

* cited by examiner

FIRMWARE STORAGE MEDIUM WITH CUSTOMIZED IMAGE

BACKGROUND

Many electronic devices such as computer systems are manufactured with some default functionality. In many cases, the functionality of such electronic devices can be customized by a manufacturer, vendor, or end-user. Unfortunately, customizing an electronic device is often a non-trivial task involving some time and technical expertise. Also, customizations for an electronic device may be specific to a particular vendor or end-user. Further, customizations for an electronic device may become outdated or mishandled (corrupted or deleted). In general, facilitating customization of electronic devices would be desirable.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more parts and may be used to refer to a computer system, a portion of a computer system, or a network of computer systems.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

By way of introduction and without limitation to embodiments, computer system (or other device) vendors design products for certain markets. In some cases, there is a need to customize products such that they are different from the standard offering. The customization request may come from the original system designer, from another company that intends to re-brand or resell the products, or from an end-user. For example, the reseller may want the product to appear as the reseller's product rather than the original manufacturer's product. In general, the reseller might want to replace information presented during the boot process (e.g., the power-on self-test (POST) logo, the system manufacturer and the product name). In addition, the reseller might want the system to behave differently from the standard offering (e.g., certain defaults such as the boot order and/or the serial port configuration could be changed). In order to support customization, the ability to provide/update default firmware images and custom firmware images without negatively affecting the other is needed.

As disclosed herein, embodiments of the invention facilitate selective customization of electronic devices. In at least some embodiments, an electronic device comprises a firmware storage medium having a first sector with a default image (e.g., for boot tasks or runtime tasks) and a second sector reserved for a customized image (e.g., for boot tasks or runtime tasks). The tasks performed by the electronic device can be designated as either customizable tasks or non-customizable tasks. When a customizable task is invoked, the electronic device determines whether a customized image is stored in the second sector and, if so, whether information in the customized image is related to the customizable task. If information related to the customizable task is found in a customized image of the second sector, the electronic device performs the customizable task based on the customized image. If information related to the customizable task is not found in the second sector, the electronic device performs the customizable task based on the default image. Also, when a non-customizable task is invoked, the electronic device performs the non-customizable task based on the default image. If a task cannot be performed using the customized image or the default image, a search or request for the needed information is performed. In at least some embodiments, the default image and the customized images are selectively and separately updatable (e.g., by flashing the first sector or the second sector of the firmware storage medium).

In at least some embodiments, the firmware storage medium stores the Basic Input/Output System (BIOS) of a computer system. Additionally or alternatively, the firmware storage medium may be associated with a management processor that enables an electronic device to be remotely controlled. In such embodiments, updates to the default image and/or to the customized image can be performed via the management processor. In at least some embodiments, the default image and the customized image are accessed as virtual storage device images. Examples of virtual storage device images include virtual floppy images, virtual optical disc images (e.g., CD or DVD images), virtual memory stick/card images (e.g., USB stick images, SD card images), or other storage device images.

Figure 1:
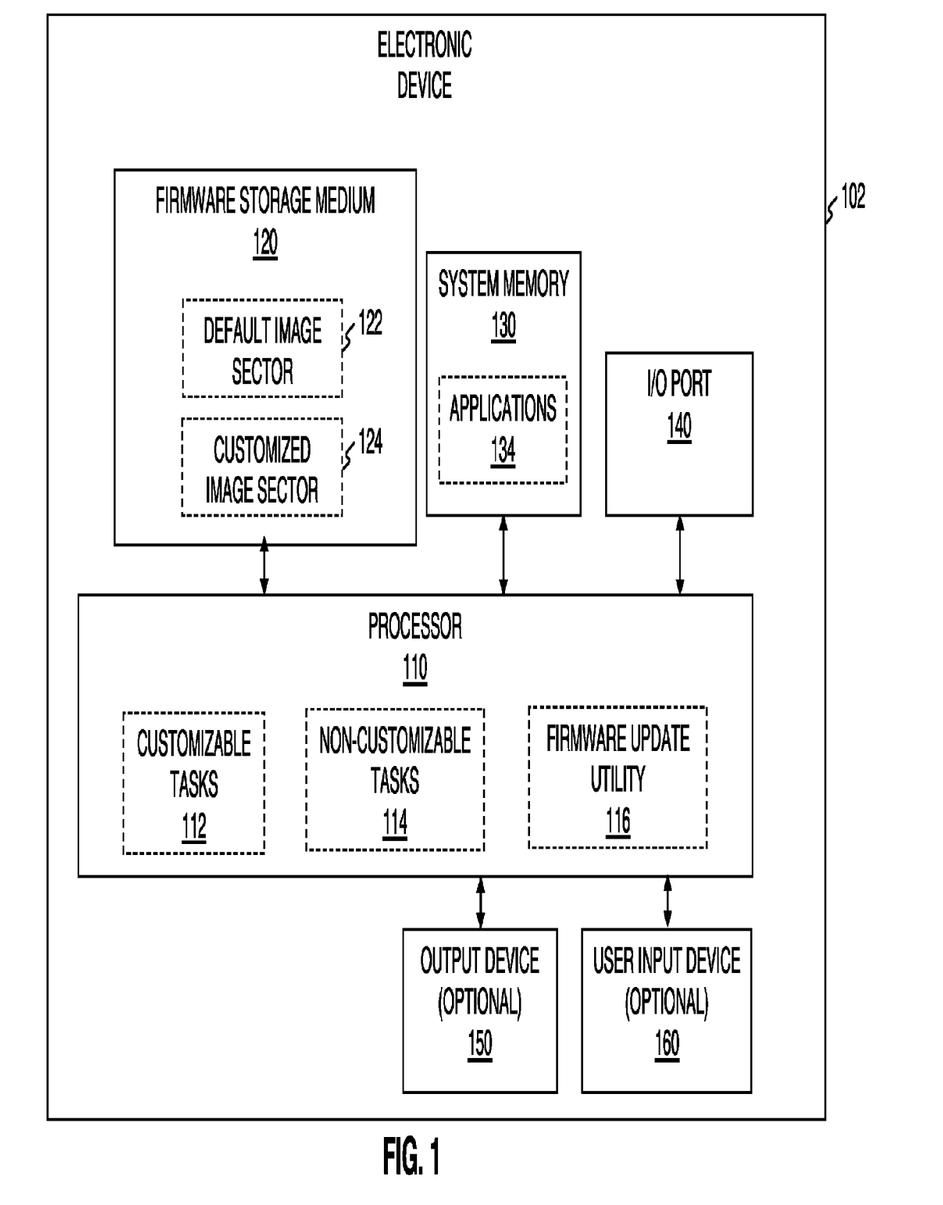
FIG. 1 illustrates an electronic device in accordance with embodiments of the disclosure.

FIG. 1 illustrates an electronic device 102 in accordance with embodiments of the disclosure. The electronic device 102 could be representative of a desktop computer, a laptop computer, a personal digital assistant (PDA), a cell phone, a smart phone, or other electronic devices. As shown in FIG. 1, the electronic device 102 comprises a processor 110 that selectively performs customizable tasks 112 and non-customizable tasks 114. The customizable tasks 112 and non-customizable tasks 114 may be based on code internal to the processor 110 or code received from another source (e.g., applications 134 stored in the system memory 130, a portable storage medium or network accessed via an I/O port 140, or a network accessed via an I/O port 140). In either case, performing at least some of the customizable tasks 112 or non-customizable tasks 114 involves retrieving information stored in a firmware storage medium 120 coupled to the processor 110.

As shown, the firmware storage medium 120 comprises a default image sector 122 and a customized image sector 124. The default image sector 122 stores at least one default image having information related to performing customizable tasks 112 and/or non-customizable tasks 114. The customized image sector 122 selectively stores at least one customized image having information related to performing at least one customizable task 112. In general, the default image sector 122 is reserved for default images even if no default images are provided or even if default images do not occupy all of the default image sector 122. Similarly, the customized image sector 124 is reserved for customized images even if no customized images are provided or even if customized images do not occupy all of the customized image sector 124.

In at least some embodiments, "images" stored in the default image sector 122 and the customized image sector 124 correspond to virtual storage device images such as virtual floppy images, virtual optical disc images (e.g., CD or DVD images), virtual memory stick/card images (e.g., USB stick images, SD card images), or other storage device images. In such embodiments, the processor 110 accesses virtual images by reading from a device mapped to the virtual image. In alternative embodiments, "images" stored in the default image sector 122 and the customized image sector 124 correspond to information that is directly accessible to the processor 110 via appropriate read commands and addressing schemes.

In at least some embodiments, the processor 110 selectively executes a firmware update utility 116. The firmware update utility 116 may be based on code internal to the processor 110 or code received from another source (e.g., the applications 134 stored in the system memory 130, a portable storage medium accessed via an I/O port 140, or a network accessed via an I/O port 140). When executed, the firmware update utility 116 causes the processor 110 to update images in the default image sector 122. Additionally or alternatively, the firmware update utility 116 causes the processor 110 to update images in the customized image sector 124. In at least some embodiments, the default image sector 122 and the customized image sector 124 are updated separately. In such embodiments, separate firmware update utilities may be used to update the default image sector 122 and the customized image sector 124. If desired, the separate firmware update utilities may be accessed by different parties. For example, a first party (e.g., manufacturer, vendor or end-user) may be able to update the default image sector 122 while a second party (e.g., manufacturer, vendor or end-user) can update the customized image sector 124. As desired, the customization process can be controlled by a manufacturer, vendor, or end-user without affecting default information. Similarly, the default process can be controlled by a manufacturer, vendor, or end-user without affecting customized information.

As shown, the electronic device 102 optionally comprises at least one user input device 160 (e.g., keyboard, touchpad, buttons, keypad, dials, mouse, track-ball, card reader, or other input devices) and/or at least one output device 150 (e.g., liquid crystal display (LCD), printer, video monitor, touch screen display, a light-emitting diode (LED) or other output devices) coupled to the processor 110. In other words, the electronic device 102 may support direct user interaction. In alternative embodiments, the electronic device 102 does not support direct user interaction (e.g., a headless server), but may be accessible via other devices.

Figure 2:
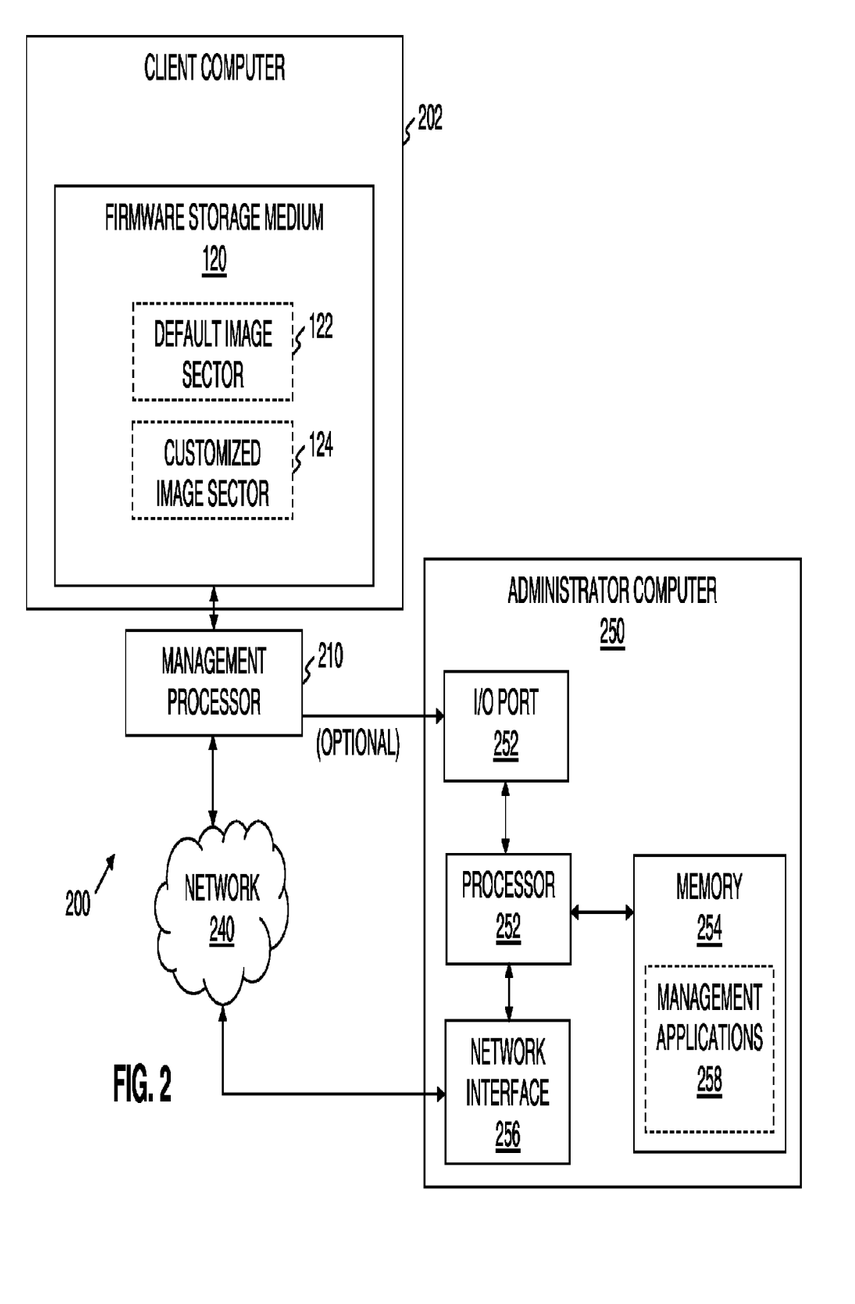
FIG. 2 illustrates a system in accordance with embodiments of the disclosure.

FIG. 2 illustrates a system 200 in accordance with embodiments of the disclosure. As shown, the system 200 comprises a client computer 202, having the firmware storage medium 120 as described for FIG. 1, in communication with an administrator computer 250. In FIG. 2, the client computer 202 comprises a management processor 210 coupled to the firmware storage medium 120. The management processor 210 enables the administrator computer 250 to communicate with and control functions of the client computer 202. One example of a management processor 210 is referred to as an Integrated Lights-Out (iLO) processor. Examples of control functions provided by the management processor 210 include, but are not limited to, console redirection, temperature monitoring, fan control/monitoring, remote power management, and remote media redirection.

In at least some embodiments, the client computer 202 also comprises some or all of the other components described for FIG. 1 (e.g., the processor 110, the system memory 130 and/or other components). In such case, the firmware storage medium 120 may be part of or is accessible to both the processor 110 and the management processor 210. Alternatively, some portions of the firmware storage medium 120 are accessible to the processor 110 while other portions of the firmware storage medium 120 are accessible to the management processor 210. Alternatively, all portions of the firmware storage medium 120 are accessible to the processor 110 while only some portions of the firmware storage medium 120 are accessible to the management processor 210. Alternatively, all portions of the firmware storage medium 120 are accessible to the management processor 210 while only some portions of the firmware storage medium 120 are accessible to the processor 110.

In accordance with some embodiments, the management processor 210 comprises a component coupled to a communication interface (not shown for convenience) such as a Peripheral Component Interconnect (PCI), PCI-Express, PCI-X or other such interfaces. Thus, communications between the client computer 202 and the administrator computer 240 involve sending/receiving data via such an interface. Additionally, communications between the client computer 202 and the administrator computer 240 occur via a network 240 (e.g., a local area network (LAN) or wide area network (WAN)) or a direct connection (e.g., an I/O port 252 of the administrator computer 250). In either case, data transferred from the administrator computer 250 to the management processor 210 may be converted from one communication protocol (e.g., a network protocol such as TCP/IP) to another communication protocol (e.g., a USB protocol) for use by the client computer 202.

In at least some embodiments, the management processor 210 facilitates communications and control functions of the administrator computer 250 by emulating a data endpoint. For example, the management processor 210 may emulate floppy drives, optical drives, a USB host controller, USB peripheral devices and/or USB hubs to facilitate communications and control functions of the administrator computer 250. For more information on management processor emulation, reference may be had to U.S. patent application Ser. No. 11/065,997, filed Feb. 24, 2005 and entitled "Method and systems for managing a device" and to U.S. patent application Ser. No. 11/477,060, filed Jun. 28, 2006 and entitled "Emulating a USB host controller," which are hereby incorporated herein by reference.

As shown in FIG. 2, the administrator computer 250 comprises a processor 252 coupled a memory storing management applications 258. When executed by the processor 252, the management applications 258 cause the administrator computer 250 to communicate with and control functions of the client computer 202. As an example, the management applications 258 may cause the administrator computer 250 to monitor the operation and performance of the client computer 202. If the client computer 202 is a "headless" device (e.g., a server), the management applications 258 may cause the administrator computer 250 to display information regarding the condition of the client computer 202 to an administrator. Using the emulation capabilities of the management processor 210, the administrator computer 250 and peripheral devices of the administrator computer 250 (e.g., a floppy drive, a CD-ROM drive) can, for example, control the reboot process of the client computer 202 if an emergency or maintenance condition occurs. If such a condition occurs, the client computer 202 is able to recognize an emulated floppy drive image or emulated optical drive image provided by the management processor 210 and uses the image during the boot process (even if a real floppy drive or optical drive of the computer 202 is unavailable).

Additionally or alternatively, the management applications 258 selectively cause the administrator computer 250 to provide updates, drivers, documentation or other types of support information to the client computer 202. Such support information may be provided to the client computer 202 upon request or during a scheduled (or random) maintenance operation provided by the administrator computer 250 and involving the client computer 202. If support information needed by the client computer 202 is already stored in the default image sector 122 or the customized image sector 124 of the firmware storage medium 120, the administrator computer 250 may simply access the support information in the firmware storage medium 120 rather than provide the support information. In various embodiments, the level of access to different types of support information may be controlled differently. For example, some support information may only be accessible using the administrator computer 250 while other support information is accessible without the administrator computer 250. Additionally or alternatively, some support information may only be accessible from the client computer 202 (i.e., the administrator computer 250 is unable to access some of the support information in the firmware storage medium 120).

Figure 3:
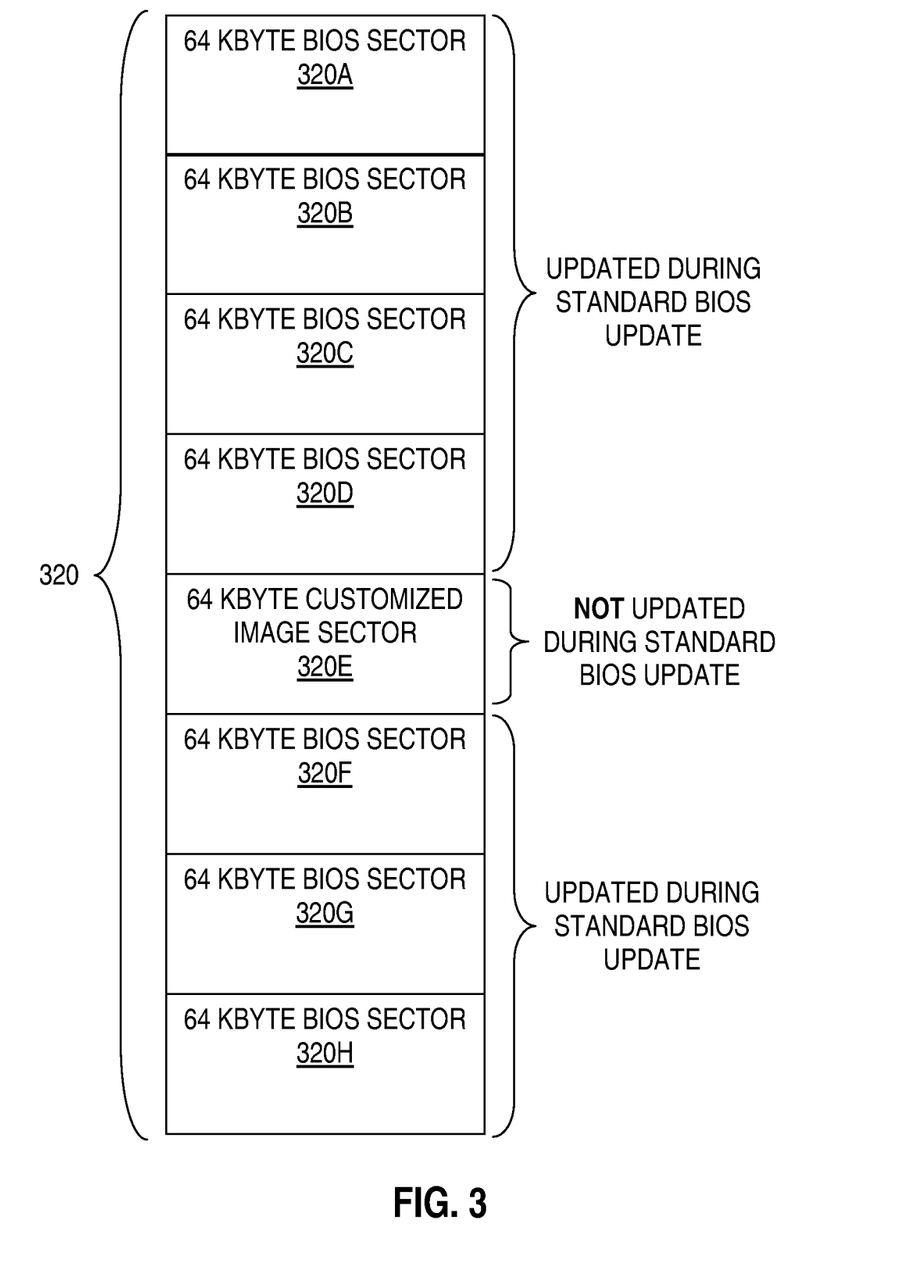
FIG. 3 illustrates sectors of a firmware storage medium in accordance with embodiments of the disclosure.

FIG. 3 illustrates sectors of a firmware storage medium 320 in accordance with embodiments of the disclosure. In at least some embodiments, the firmware storage medium 320 corresponds to the firmware storage medium 120 of FIGS. 1 and 2. As shown, the firmware storage medium 320 comprises a plurality of 64 Kbyte sectors 320A-320H, where sectors 320A-320D and 320F-320H are updated during a standard BIOS update. In contrast, sector 320E is not updated during a standard BIOS update. In accordance with at least some embodiments, sectors 320A-320D and 320F-320H correspond to the default image sector 122 while sector 320E corresponds to the customized image sector 124 previously discussed. Accordingly, when sector 320E is updated (during a customized image update), sectors 320A-320D and 320F-320H are not updated.

In at least some embodiments, the firmware storage medium 320 varies from the format shown in FIG. 3. For example, the size of the sectors is not limited to 64 Kbyte. Further, the position of the customized image sector (sector 320E) can be different. Further, additional sectors (besides sector 320E) can be reserved as customized image sectors. Further, the sectors 320A-320H may correspond to sectors of a single firmware chip or sectors of multiple firmware chips. As an example, the firmware storage medium 320 may be included with a BIOS chip, a management processor chip, or both. Further, although the firmware storage medium 320 of FIG. 3 is related to BIOS, other firmware storage mediums do not involve BIOS.

Figure 4:
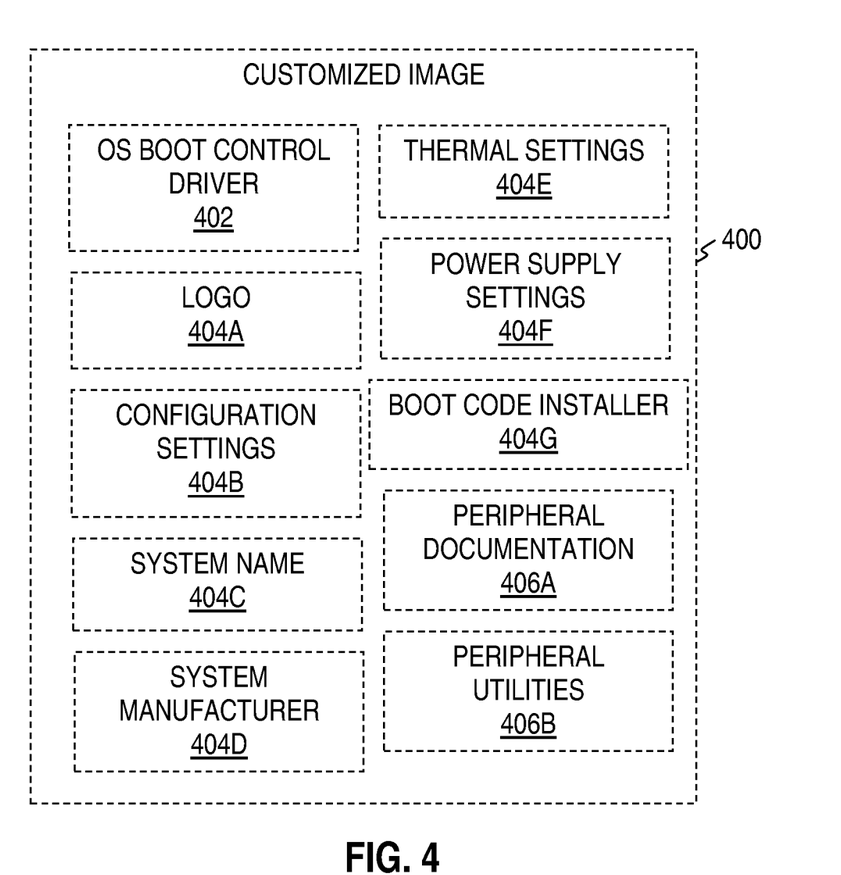
FIG. 4 illustrates a customized firmware image in accordance with embodiments of the disclosure.

FIG. 4 illustrates a customized firmware image 400 in accordance with embodiments of the disclosure. The customized firmware image 400 may be stored, for example, in the customized image sector 124 previously described. In accordance with some embodiments, the customized firmware image 400 comprises an operating system (OS) boot control driver 402 to be accessed during the boot process of a corresponding device. Additionally or alternatively, the customized firmware image 400 comprises a logo 404A (for display during the boot process), configuration settings 404B, a system name 404C, a system manufacturer 404D, thermal settings 404E, power supply settings 404F and/or boot code installer 404G to be accessed during a boot process of a corresponding device. Examples of configuration settings 404B include security settings, boot order, default COM port settings and/or default Serial Console settings. The boot order specifies the order in which system firmware (BIOS) selects a boot device from all possible boot devices installed in the system. In at least some embodiments, the boot code installer 404G uses an option ROM format or other installation technique. The boot code installer 404G can be used by a manufacturer, vendor, or end-user to install a configuration utility or other interactive application that can be invoked during the boot process, to perform a custom configuration for a device, to display text or images (e.g., additional logos) during the boot process, to install a network stack and/or perform network traffic diagnostics, or other functions.

Additionally or alternatively, the customized firmware image 400 comprises peripheral documentation 418 (e.g., instruction manuals) and/or peripheral utilities 420 (e.g., drivers) to be accessed during runtime of a corresponding device. In accordance with various embodiments, the elements of the customized firmware image 400 may be accessed separately (as separate images) or together (as a single image). Further, the elements of the customized firmware image 400 may be stored in separate customized image sectors or a single customized image sector. Likewise, the elements of the customized firmware image 400 may be updated together or separately. Further, different elements of the customized firmware image 400 may be accessible to a client computer (e.g., the client computer 202), an administrator computer (e.g., the administrator computer 250), or both.

Figure 5:
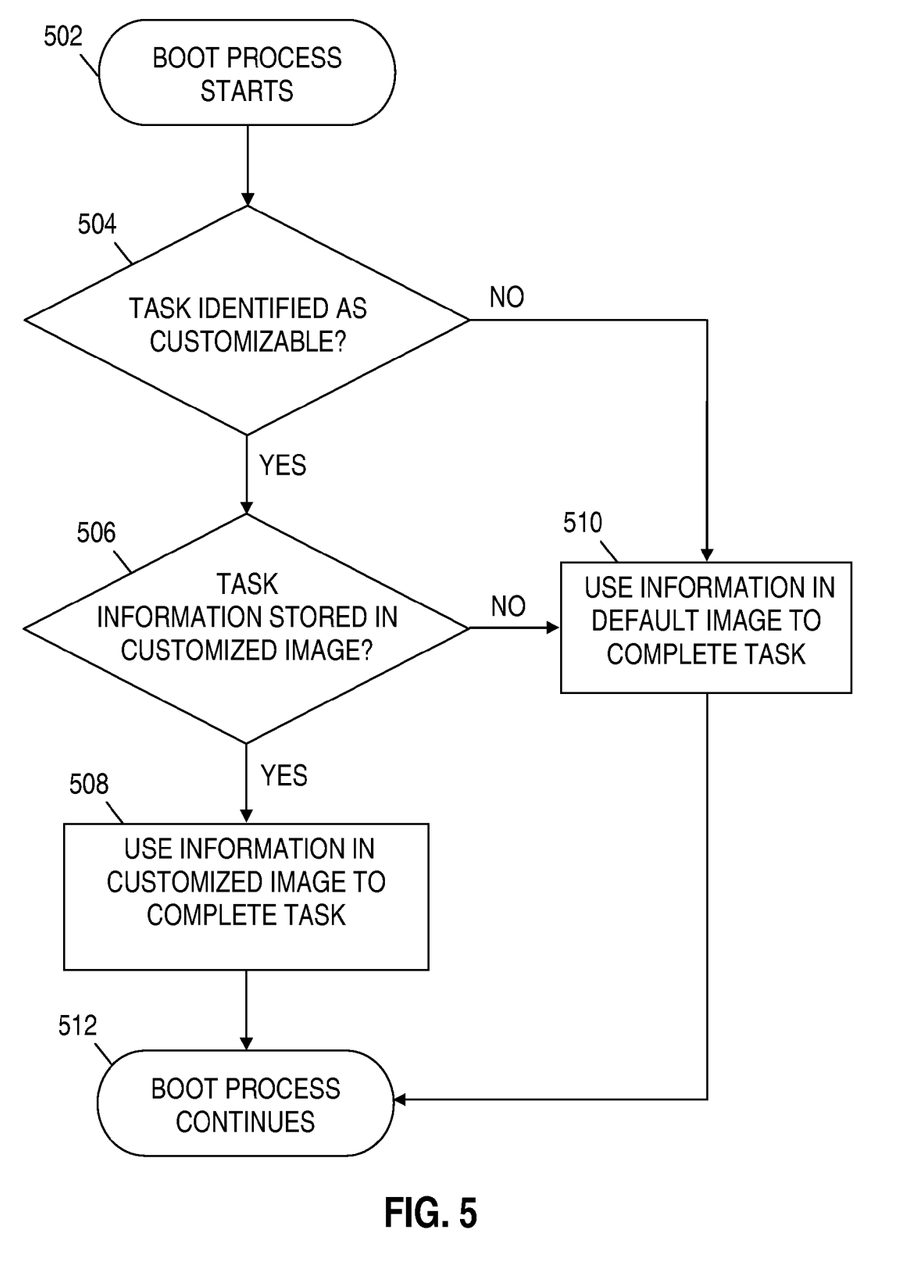
FIG. 5 illustrates a method in accordance with embodiments of the disclosure.

FIG. 5 illustrates a method 500 in accordance with embodiments of the disclosure. The method 500 comprises starting a boot process (block 502). If a task is identified as customizable (decision block 504), the method 500 determines if task information is stored in a customized firmware image (decision block 506). If a task is not identified as customizable (decision block 504) or if task information is not stored in the customized firmware image (decision block 506), information in a default firmware image is used to complete the task (block 510). Otherwise, information in the customized firmware image is used to complete the task (block 508) and the boot process continues at block 512.

Figure 6:
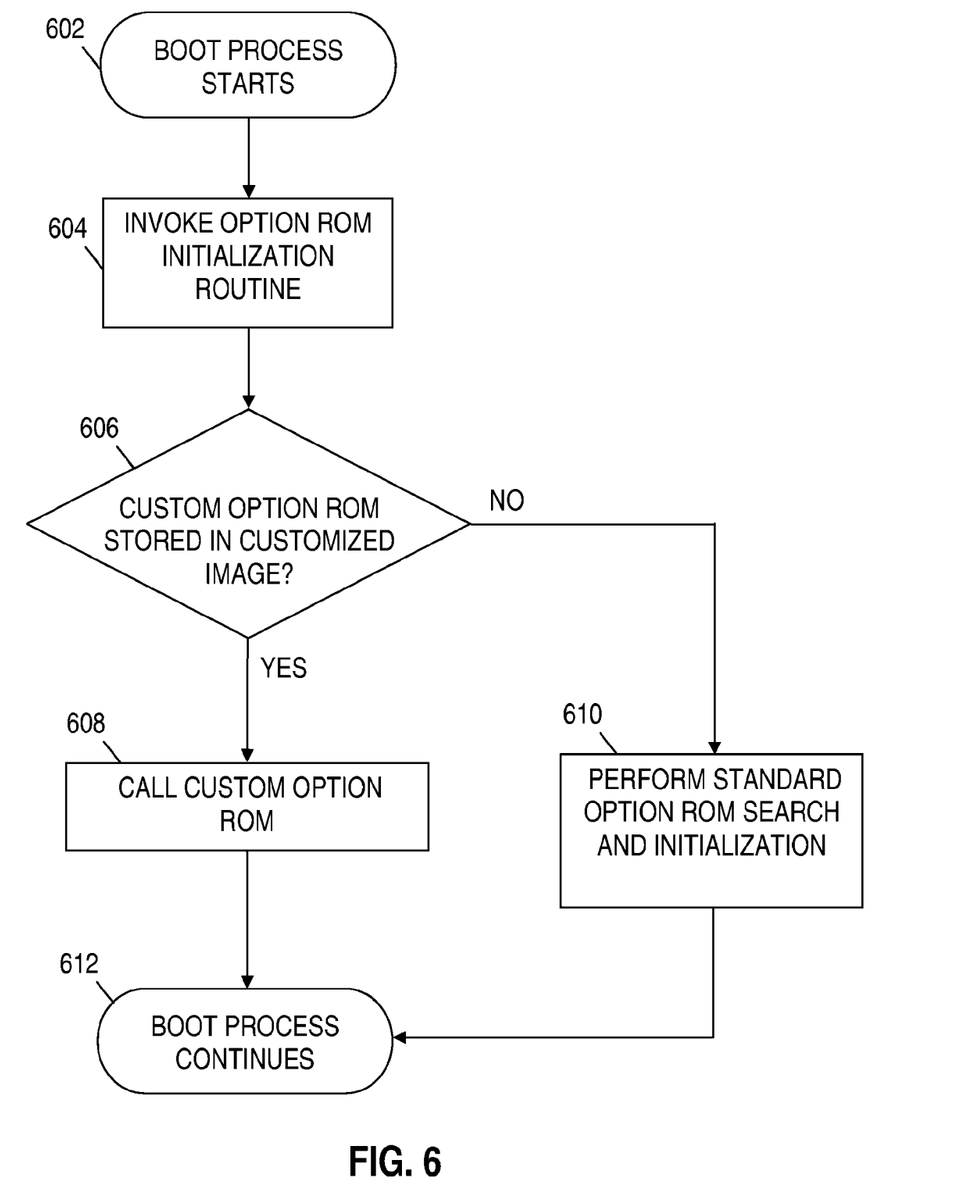
FIG. 6 illustrates another method in accordance with embodiments of the disclosure.

FIG. 6 illustrates another method 600 in accordance with embodiments of the disclosure. The method 600 comprises starting a boot process (block 602). At block 604 an option ROM initialization routine is invoked. If a custom option ROM is stored in a customized firmware image (decision block 606), the custom option ROM is called (block 608) and the boot process continues at block 612. If a custom option ROM is not stored in a customized firmware image (decision block 606), a standard option ROM search and initialization is performed (block 610) and the boot process continues at block 612.

Figure 7:
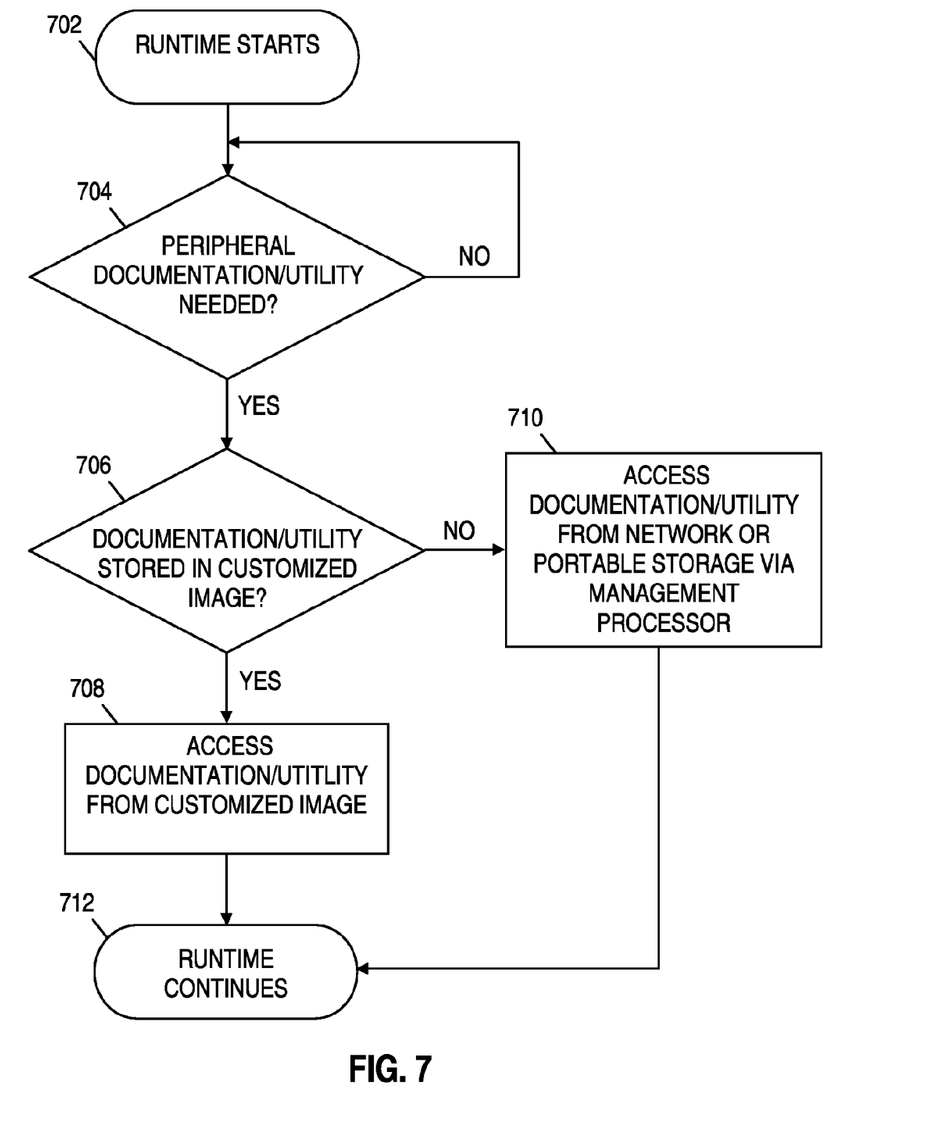
FIG. 7 illustrates another method in accordance with alternative embodiments of the disclosure.

FIG. 7 illustrates another method 700 in accordance with alternative embodiments of the disclosure. The method 700 comprises starting runtime (block 702). If a peripheral documentation or utility is needed (decision block 704), the method 700 determines if related documentation or utilities are stored in a customized firmware image (decision block 706). If so, the documentation or utilities are accessed from the customized firmware image (block 708) and runtime continues at block 712. If related documentation or utilities are not stored in a customized firmware image (decision block 706), the documentation or utilities are accessed via a management processor (e.g., the management processor 210) from network or portable storage (block 710) and runtime continues at block 712. In some embodiments, documentation or utilities are provided from an administrator computer 250.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   a processor; and
   a firmware storage medium in communication with the processor, the firmware storage medium stores a default image invoked during a boot process and selectively stores a customized image;
   wherein the processor is to determine whether a task is a user-configurable task and if the task is user-configurable, the processor is to determine whether a customized image containing information pertaining to the task is stored in the firmware storage medium, and if the customized image is stored in the firmware storage medium, the processor is to perform the task using the information from the customized image, else the processor is to perform the task using information from the default image; and
   wherein if the task is not user-configurable, the processor is to perform the task using the information from the default image;
   wherein the task is to be performed as part of a boot process to configure a feature of the computer system.

2. The computer system of claim 1 wherein, if the customized image is stored in the firmware storage medium, the boot process selectively adds at least part of the customized image to the default image.

3. The computer system of claim 1 wherein the default image and the customized image are separately flashable.

4. The computer system of claim 1 wherein the customized image comprises an operating system (OS) boot control driver.

5. The computer system of claim 1 wherein the customized image comprises at least one of a logo, a system name and a system manufacturer.

6. The computer system of claim 1 wherein the customized image comprises at least one of configuration settings, thermal settings and power supply settings.

7. The computer system of claim 1 wherein the customized image comprises option ROM code.

8. The computer system of claim 1 wherein the firmware storage medium comprises a Basic Input/Output System (BIOS) and wherein the customized image is accessed as a virtual storage device image.

9. The computer system of claim 1 wherein the processor comprises a management processor that enables the computer system to be remotely controlled, wherein the customized image is accessed during runtime as a virtual storage device image via the management processor.

10. The computer system of claim 9 wherein the customized image comprises at least one of documentation and utilities for peripherals of the computer system.

11. The computer system of claim 9 wherein the customized image is updated via the management processor.

12. A method, comprising:
    storing a default image in a firmware storage medium;
    selectively storing a customized image in the firmware storage medium;
    determining whether a task is a user-configurable task;
    if the task is user-configurable, determining whether a customized image containing information pertaining to the task is stored in the firmware storage medium, and if the customized image is stored in the firmware storage medium, performing the task using the information from the customized image, else performing the task using information from the default image; and
    if the task is not user-configurable, performing the task using the information from the default image;
    wherein the task is to be performed as part of a boot process to configure a feature of a computer system.

13. The method of claim 12 further comprising selectively updating the customized image without updating the default image.

14. The method of claim 12 further comprising selectively updating the default image without updating the customized image.

15. The method of claim 12 further comprising storing at least one item as the customized image, the item selected from the group consisting of an OS boot control driver, a logo, a system name, a system manufacturer, configuration settings, thermal settings, power supply settings, option ROM code, peripheral device documentation, and peripheral device utilities.

16. The computer system of claim 1 wherein the task is at least one of displaying a power-on self-test (POST) logo and specifying a boot order.

* * * * *